United States Patent [19]

Inoue

[11] 4,386,256
[45] May 31, 1983

[54] MACHINING METHOD AND APPARATUS

[75] Inventor: Kiyoshi Inoue, Tokyo, Japan

[73] Assignee: Inoue-Japax Research Incorporated, Yokohama, Japan

[21] Appl. No.: 222,763

[22] Filed: Jan. 6, 1981

Related U.S. Application Data

[63] Continuation-in-part of Ser. No. 202,232, Oct. 30, 1980, and a continuation-in-part of Ser. No. 4,987, Jan. 19, 1979, Pat. No. 4,289,947.

[30] Foreign Application Priority Data

| Jan. 17, 1978 | [JP] | Japan | 53/2824[U] |
|---|---|---|---|
| Mar. 2, 1978 | [JP] | Japan | 53/25633[U] |
| Aug. 28, 1978 | [JP] | Japan | 53/117434[U] |
| Oct. 31, 1979 | [JP] | Japan | 54/139819 |
| Oct. 31, 1979 | [JP] | Japan | 54/150169[U] |
| Nov. 8, 1979 | [JP] | Japan | 54/154160[U] |
| Nov. 28, 1979 | [JP] | Japan | 54/153042 |
| Nov. 28, 1979 | [JP] | Japan | 54/153043 |

[51] Int. Cl.³ .............................................. B23P 1/08
[52] U.S. Cl. ............................... 219/69 M; 219/69 G; 219/69 V; 204/129.7
[58] Field of Search .............. 219/69 D, 69 M, 69 V; 204/129.6, 129.7

[56] References Cited

U.S. PATENT DOCUMENTS

| 3,378,473 | 4/1968 | Inoue | 204/129.7 |
|---|---|---|---|
| 3,717,567 | 2/1973 | Bodine | 219/69 R |

FOREIGN PATENT DOCUMENTS

| 276823 | 4/1964 | Australia | 204/129.7 |
|---|---|---|---|
| 2901712 | 8/1979 | Fed. Rep. of Germany | 219/69 D |

*Primary Examiner*—M. H. Paschall
*Attorney, Agent, or Firm*—Karl F. Ross; Herbert Dubno

[57] ABSTRACT

A method of and apparatus for machining, especially electroerosion machining, of a workpiece immersed in a machining liquid received in a worktank with a tool juxtaposed with the workpiece to define a machining interface therebetween filled with the machining liquid. A plurality of ultrasonic assemblies are disposed in the worktank in such a manner that they are spaced apart from each other and arranged to surround the region of the machining interface in a wave-transmitting relationship therewith through the machining liquid and individually energized to provide ultrasonic vibrations of a frequency of 0.05 to 10 MHz which are transmitted to the region of the machining interface through the machining liquid. Each of the ultrasonic assemblies is formed with a fluid injection nozzle and positionable to orient the latter in the direction of the machining interface, through which nozzle a forced flow of the machining liquid is provided from a liquid source. The ultrasonic vibrations are thus imparted at each nozzle to the machining liquid forced in the direction of the machining interface. The ultrasonic transducers are responsive to a gap parameter and an additional vibration of less than 50 KHz can be impressed on the machining liquid.

25 Claims, 13 Drawing Figures

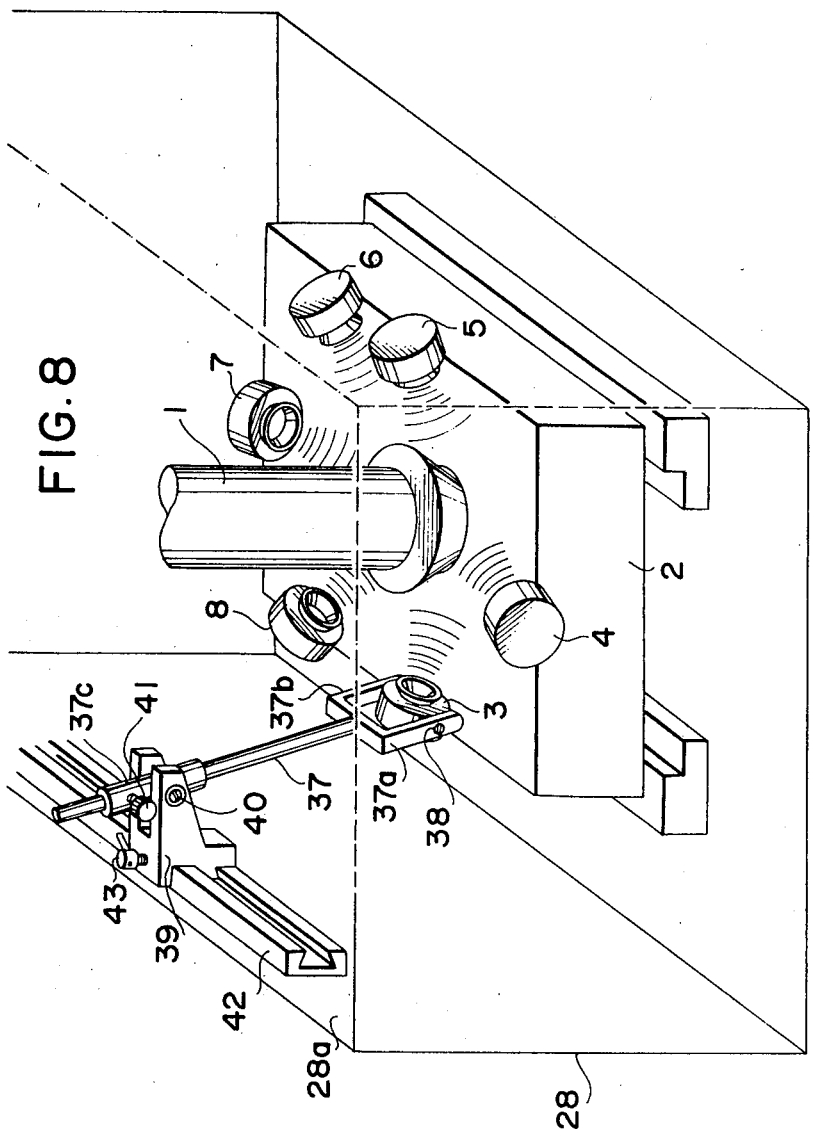

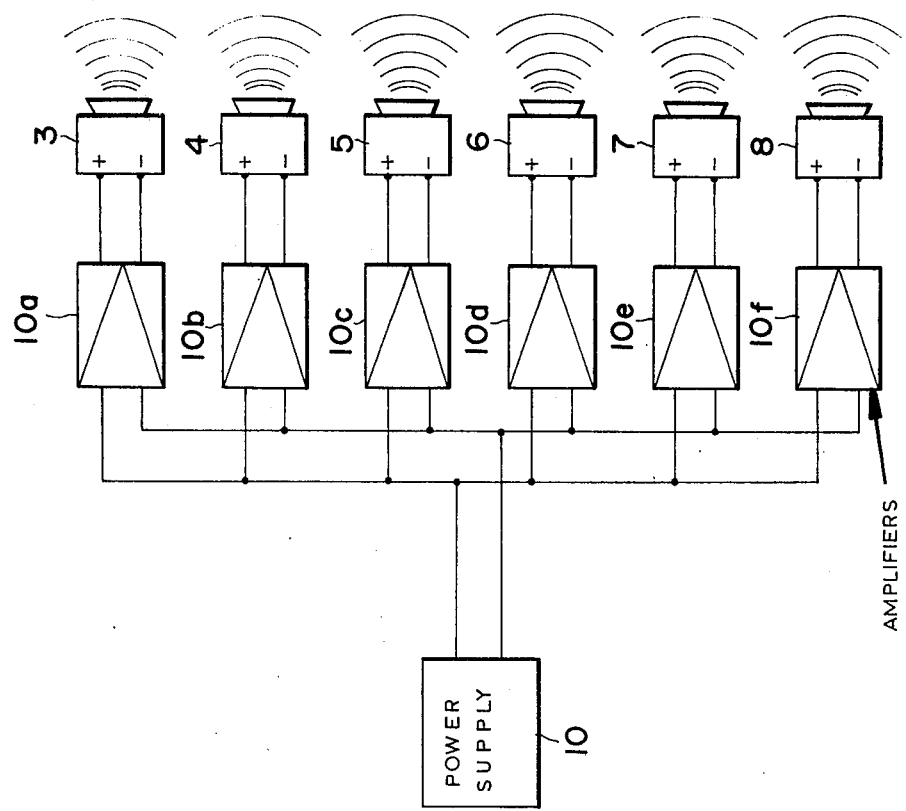
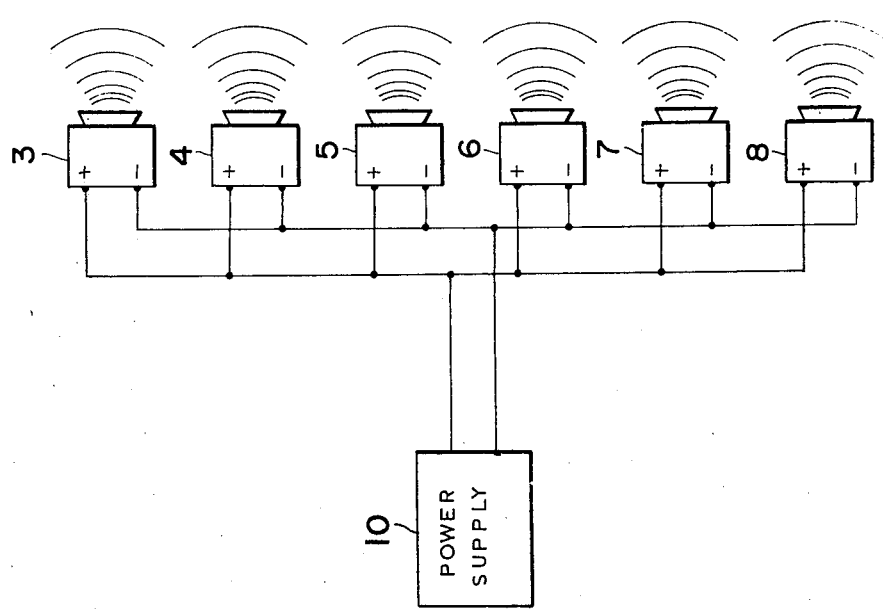

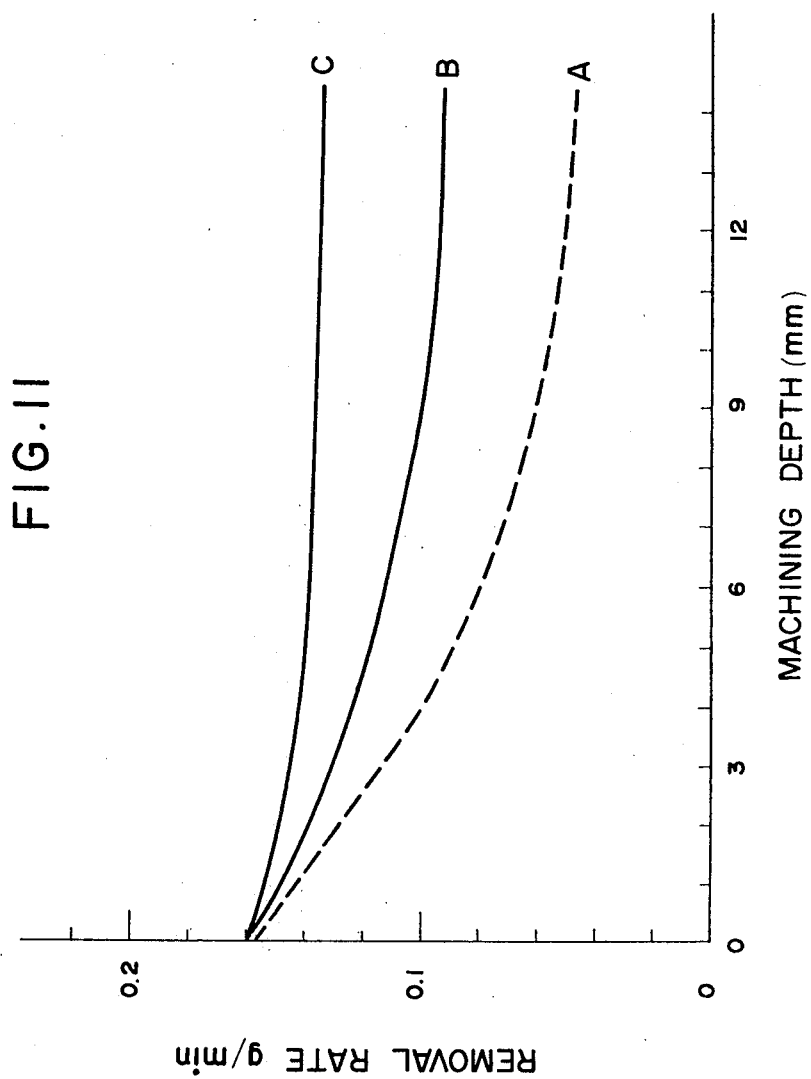

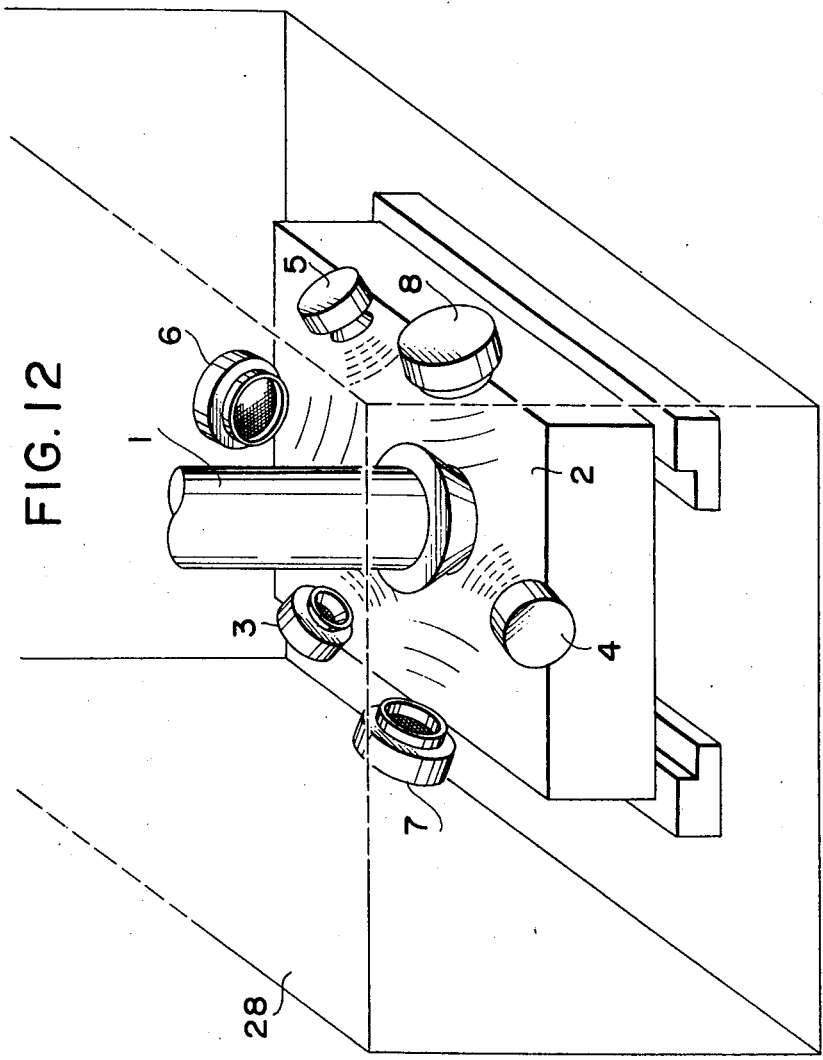

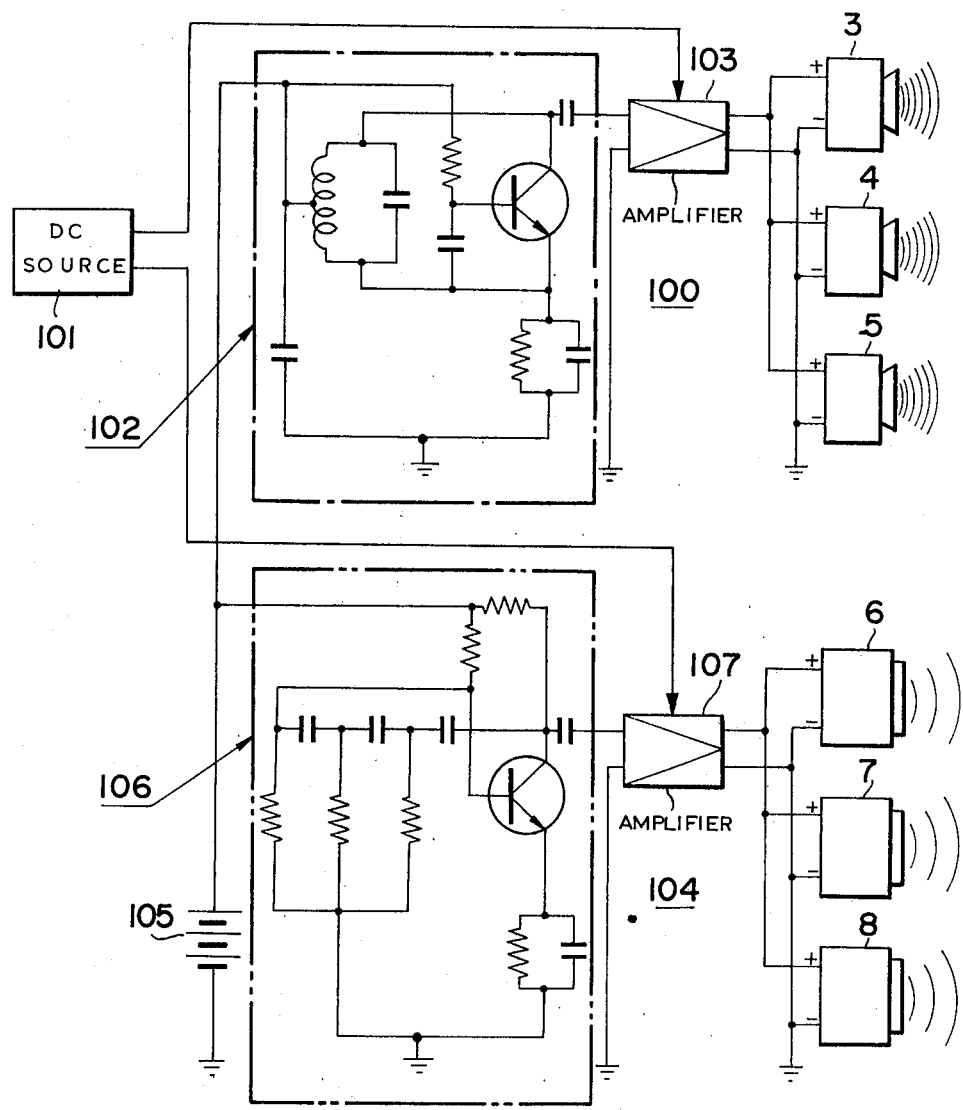

MACHINING METHOD AND APPARATUS

CROSS-REFERENCE TO RELATED APPLICATIONS

This application is a continuation in part of and discloses and claims the subject matter disclosed in my copending patent application Ser. No. 202,232 filed Oct. 30, 1980 which is a continuation in part of Ser. No. 004,987 filed Jan. 19, 1979 (now U.S. Pat. No. 4,289,947 issued Sept. 15, 1981).

FIELD OF THE INVENTION

The present invention relates generally to machining and, more particularly, to a machining process and apparatus.

The term "machining" is used herein broadly to include a material removal process such as sinking, shaping, cutting, drilling or grinding in which material is removed from a workpiece as well as a material addition process such as plating, depositing or forming in which material is removed from a machining liquid and added to the workpiece.

The invention relates specifically (but not exclusively) to an electrical machining method and apparatus, including the steps and means suitable to stabilize the conditions in an electrical machining gap.

The term "electrical machining" is herein intended primarily to refer to electrical discharge machining (EDM), but it should be understood that the invention is equally applicable to any other form of electrical machining such as electrochemical machining (ECM), electrochemical-discharge machining (ECDM) and electroplating as well as non-electrical or traditional machining which makes use of a mechanical or abrasive material removal process.

In either electrical removal and addition processes, as they are concerned here, a tool electrode is juxtaposed with a workpiece to define a minute machining gap therebetween in the presence of a machining liquid or medium and an electric current is passed between the electrode and the workpiece through the liquid-filled minute machining gap to electrically remove or add material from or to the workpiece surface. A power supply for furnishing the machining current is designed preferably to provide a high-current density electric current in the region of the machining gap such that material removal or addition at the workpiece surface may take place in close conformity with the shape of the tool electrode. Means is commonly provided to advance one of the tool electrode and the workpiece towards the other so as to maintain the machining gap substantially constant as material removal or addition at the workpiece surface proceeds.

BACKGROUND OF THE INVENTION

It has long been recognized that the electrical machining of a conductive workpiece, e.g. the electrical-discharge machining, electrochemical machining or electroplating of workpiece portions juxtaposed with an electrode, is often characterized by a non-uniform current distribution across the gap separating the electrode surface from the workpiece surface to be machined. This non-homogeneous current distribution mostly derives from a contamination of the machining medium in the form of accumulations or concentrations of ions, machining chips and other gap products, along one or the other surface of the electrodes. Moreover, the non-uniform distribution of the flow of current between the surfaces was also found to be, in part, a function of magnetic effects resulting from the passage of current between the electrode and the workpiece.

In U.S. Pat. No. 3,252,881 issued May 24, 1966 to Kiyoshi Inoue, it was pointed out that it was possible to effect mechanical dislodgment of ionic contaminants in an electrochemical machining gap by applying to the electrode a mechanical oscillation toward and away from the workpiece at a relative low or sonic frequency (e.g. from 10 cycles/second to 10 kilocycles/second). It was also shown that a similar result was obtained when, concurrently with the mechanical vibration of the electrode, the injection of a gaseous fluid into the electrolyte or as an alternative thereto, a supersonic vibration is applied to the electrolyte within the electrode. It was disclosed that the supersonic vibration could have a frequency ranging between substantially 10 kilocycles/second (kHz) and 10 megacyles/second (MHz) and must be produced by an electrosonic transducer mounted within the interior of the tubular electrode.

It has been found that the ultrasonic vibration may be employed in electrical-discharge machining and electroplating as well to remove the gap contaminants in these processes. For example, in electrical-discharge machining, it has been found that the ultrasonic vibration serves to stabilize the machining condition and protect the workpiece and the electrode from short-circuiting damage. In electroplating, the accumulation of electrolytic bubbles tends to be removed as a result of imparting an ultrasonic vibration to the electrolyte so that a fine plated layer may be obtained on the workpiece surface. In these processes it has been the conventional practice to impart an ultrasonic vibration to the machining liquid by means of an ultrasonic transducer element.

When the shape of a workpiece contains irregular curvatures or involves a deep boring or slitting and thus represents two-dimensional or three-dimensional forming, it has been found that a uniformity of the gap decontamination effect is not attainable by means of a transducer element if arranged in one or another manner as proposed heretofore. It has thus been a problem with conventional ultrasonic vibrator systems to effect the gap decontamination satisfactorily, efficiently and uniformly over the entire working area being processed by electrical machining.

OBJECTS OF THE INVENTION

It is accordingly an object of the present invention to provide an improved machining method and apparatus whereby the decontamination of the region of the machining gap is achieved satisfactorily, efficiently and uniformly.

Another object of the invention is to provide an improved machining method and apparatus whereby the decontamination of the region of the machining surfaces having an intricate configuration is attained with extremely high uniformity.

SUMMARY OF THE INVENTION

These and other objects of the invention are attained, in accordance with a first aspect thereof, by a machining method in which a workpiece is immersed in a machining liquid received in a worktank and a tool is juxtaposed with the workpiece in the worktank to define a machining interface therebetween filled with the machining liquid, which method comprises the steps of: disposing a plurality of ultrasonic assemblies in the said worktank in such a manner that they are spaced apart from each other and arranged to surround the said interface in a wave-transmitting relationship therewith and individually energizing said assemblies to provide ultrasonic vibrations of a frequency in excess of 0.05 MHz, moreover preferably greater than 0.1 MHz and less than 10 MHz and preferably not greater than 2 MHz and transmitting the said vibrations to the region of the said interface through the said machining liquid.

According to second aspect of the invention, there is provided a machining apparatus having a worktank for containing a machining liquid and having a workpiece immersed therein; and a tool positionable to be juxtaposed with the workpiece in the worktank to define a machining interface therebetween filled with the machining liquid, which apparatus includes: a plurality of ultrasonic assemblies disposed in the said worktank and spaced apart from each other in a manner to surround the region of the said machining interface in a wave-transmitting relationship therewith, each of the said assemblies including an electromechanical transducer; and power supply means for individually energizing the said transducers to provide at each of the locations of the said assemblies ultrasonic vibrations of a frequency between 0.05 and 10 MHz and preferably between 0.1 and 2 MHz and for transmitting the said vibrations to the region of the said machining interface through the said machining liquid.

In spite of the earlier belief in the art that it is difficult with ultrasonic waves of a frequency in excess of 0.05 MHz to provide large-output vibrations in a liquid medium and no appreciably better machining performance would be achievable, it has now been found that, where they are generated at a plurality of spaced-apart locations defined in the worktank to surround the machining interface, the ultrasonic waves of a vibrational frequency in excess of 0.05 MHz and preferably not less than 0.1 MHz but less than 10 MHz and more preferably not greater than 2 MHz are capable of increasing the removal rate or machining speed by 20 to 50% compared with the use of the conventional lower-frequency ultrasonic waves and increasing the effective distance of the generating site away from the site of the machining interface. It has been found surprisingly that such an increase in the removal rate is achieved with assemblies of a much lower output capacity.

In accordance with a further advantageous feature of the invention, each of the ultrasonic assemblies is formed with a fluid injection nozzle and is positionable to orient the latter in the direction of the machining interface, and the method further comprises: providing a forced flow of the said machining liquid from a liquid source through each of the said nozzles towards the said machining interface and applying the said high-frequency ultrasonic vibrations at each of said assemblies to the said forced flow of the said machining liquid directed to the machining interface in the said worktank. The said liquid source preferably includes a distribution chamber disposed within or outside the said worktank and having an inlet for receiving the machining liquid and outlets connected to the said nozzles through fluid conduits, each conduit being preferably in the form of a flexible tube capable of smoothing itself, e.g. a multi-joint pipe. The distribution chamber is preferably provided in addition with a low-frequency vibrator capable of vibrationally activating the machining liquid at a low frequency of 100 Hz to 50 kHz. As a result, the machining liquid forcibly supplied to the region of the machining liquid has the low-frequency sonic or ultrasonic vibrations upon which are superimposed upon each of the ultrasonic assemblies high-frequency ultrasonic vibrations. It has been found that this brings about a marked enhancement in the machining rate and efficiency, an increased cooling effect on the tool and hence an increased tool life, an increased sharpness and hence precision of a machined corner, and an increased freedom from machining instability due, for example, to detrimental arc discharge or short-circuiting conditions. The low-frequency sonic or ultrasonic vibrations at the distribution chamber and the high-frequency ultrasonic vibrations at the nozzle site may be applied to the forced flow of machining liquid simultaneously or alternately.

The high-frequency ultrasonic vibrations applied to the forced flow of machining liquid through the nozzle at each of the assemblies are preferably modified in magnitude in response to sensing the machining state at the machining interface. Thus, the power supply means may have a control circuit associated with the electromechanical transducers of the assemblies or control circuits each associated with each of the transducers for controlling the amplitude of the high-frequency ultrasonic vibrations applied to the machining liquid in response to the machining interface condition. The interface condition may be sensed in terms of the voltage, current, resistance or impedance between the tool and the workpiece.

Advantageously, the ultrasonic assemblies are disposed in the worktank so as to surround the machining interface by securing them on different wall portions of the worktank so that they are oriented in the direction of the machining interface. The electromechanical transducers in these assemblies may be energized by the power supply in synchronism or in an out-of-phase relationship with each other.

It has also been found that sometimes it is advisable that at least one of the ultrasonic assemblies disposed to surround the machining interface should operate to provide ultrasonic vibrations of a frequency different from the frequency of the ultrasonic vibration provided by the other assemblies. Alternatively, at least one auxiliary ultrasonic assembly may be disposed to surround, together with the set of the primary ultrasonic assemblies, the machining interface and may be operated to provide ultrasonic vibrations of a frequency in the range of 20 to 50 kHz. In that case the primary assemblies are adapted to provide ultrasonic vibrations of a frequency between 0.1 and 1.6 MHz. It has been found that this measure provides an increase in the rate of displacement of machining chips or products to be carried away from the machining interface, thus permitting, in an EDM operation, the discharge repetition rate to be markedly increased.

BRIEF DESCRIPTION OF DRAWINGS

These and other objects, features and advantages of the present invention will become more readily apparent from the following description of certain embodiments thereof with reference to the accompanying drawings in which:

FIG. 8 is a perspective view diagrammatically illustrating a plurality of ultrasonic assemblies disposed so as to surround the machining gap by being mounted on different wall portions of the worktank;

FIG. 9 is a circuit diagram schematically illustrating one form of the connection of a high-frequency power supply to the plural ultrasonic assemblies;

FIG. 10 is a circuit diagram schematically illustrating another form of the high-frequency power supply to the plural ultrasonic assemblies;

FIG. 11 is a graph showing EDM removal rate versus machining depth according to an embodiment of the invention compared with that with conventional systems;

FIG. 12 is a perspective view diagrammatically illustrating a plurality of ultrasonic assemblies arranged in a manner similar to that in FIG. 8 but divided into a first group and a second group which operate at a higher ultrasonic frequency and a lower ultrasonic frequency, respectively; and FIG. 13 is a circuit diagram schematically illustrating a power supply system for energizing the ultrasonic assemblies of FIG. 12.

SPECIFIC DESCRIPTION

Figure 1:
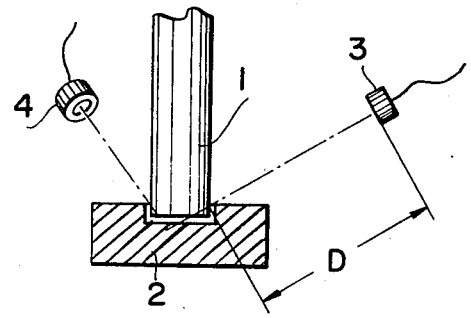
FIGS. 1 and 2 are elevational and plan views, respectively, diagrammatically illustrating an arrangement according to the invention in which three ultrasonic assemblies are disposed so as to surround the machining interface in a wave-transmitting relationship therewith through the machining liquid.
Figure 2:
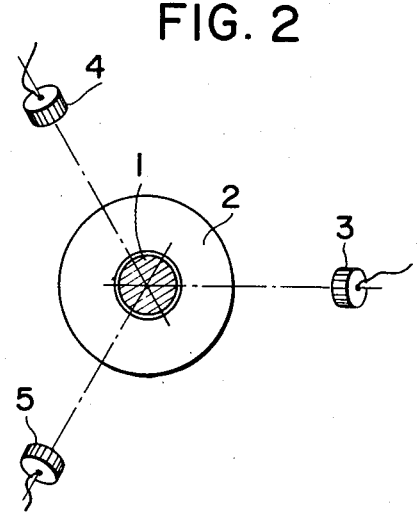

The principles, construction and advantages of the present invention will become apparent first by showing the arrangement and results of an experimentation conducted for electroerosively machining a workpiece composed of cold working die steel SKD-11 with a cylindrical copper electrode of 50 mm diameter. In FIGS. 1 and 2, the tool electrode and the workpiece are shown at 1 and 2, respectively and a plurality of ultrasonic assemblies, here three, are shown at 3, 4 and 5 as being disposed to surround the region of the machining interface or gap defined between the tool electrode 1 and the workpiece 2 in the presence of a machining liquid, e.g. a liquid hydrocarbon or distilled water received in a worktank not shown. The assemblies 3, 4 and 5 are positioned with equal distances D from the periphery of the machining gap region and oriented individually to direct ultrasonic waves produced at each assembly to the machining gap region through the machining liquid. The assemblies, 3, 4 and 5 have individual electromechanical transducers which are energized synchronously with each other by a power supply.

Figure 3:
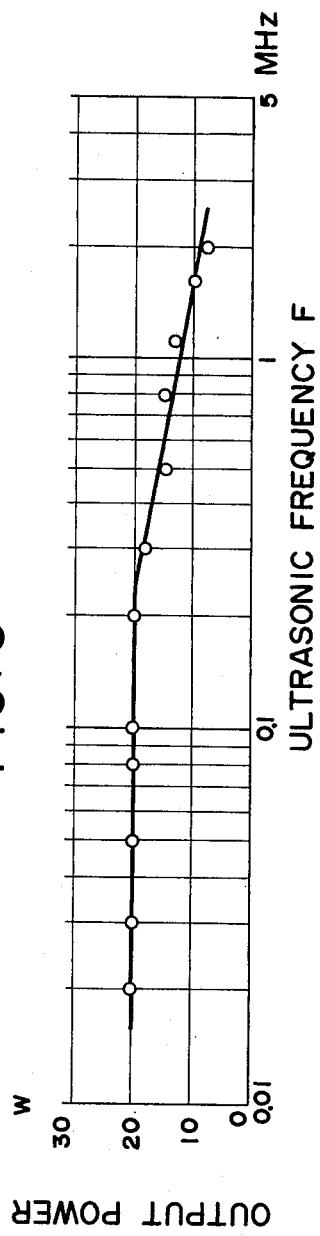
FIG. 3 is a graph in which the frequency of ultrasonic waves is plotted along the abscissa and the output power thereof is plotted along the ordinate, representing how the output power varies with increase in the frequency.

In experiments, kerosine or paraffin was used as the machining liquid and EDM machining parameters were selected to yield a surface roughness of 6 microns Rmax. Then in varying the frequency F of the vibrations of the transducers and the distance D, the mean removal rate (machining speed) and the maximum effective distance Dmax until a given machining depth was attained were measured and are plotted in FIGS. 4 and 5, respectively. In this case, transducers operating at frequencies not greater than 200 kHz had an output power of 20 watts and operating at frequencies between 500 and 800 kHz had an output power of 15 watts. Further, transducers operating at 1.6 MHz and 2 MHz had output powers of 10 and 8 watts, respectively. The relationship of the frequency and output power of the transducers used is plotted in FIG. 3.

Figure 4:
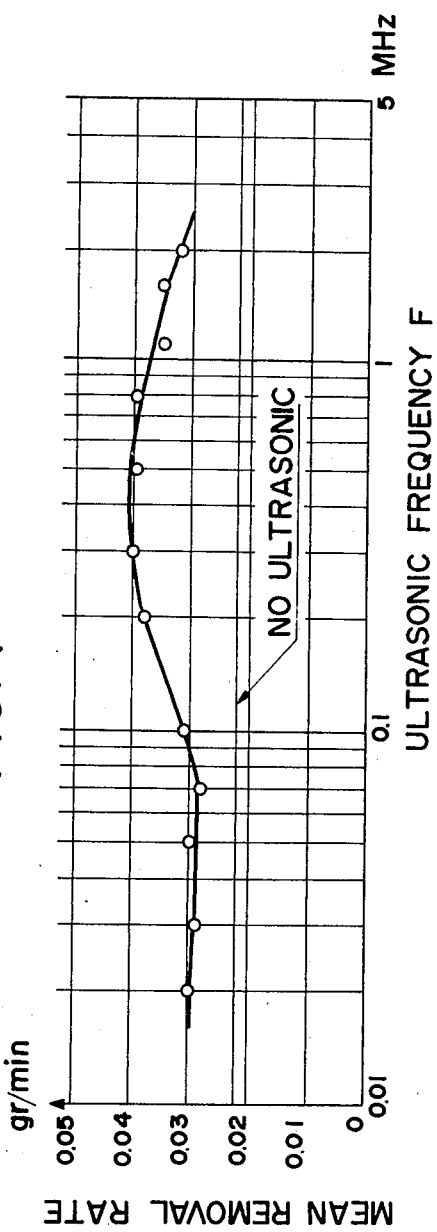
FIG. 4 is a graph in which the frequency of ultrasonic waves is plotted along the abscissa and the mean rate of EDM material removal is plotted along the ordinate, showing an optimum range of ultrasonic frequencies with the assemblies of FIGS. 1 and 2.
Figure 5:
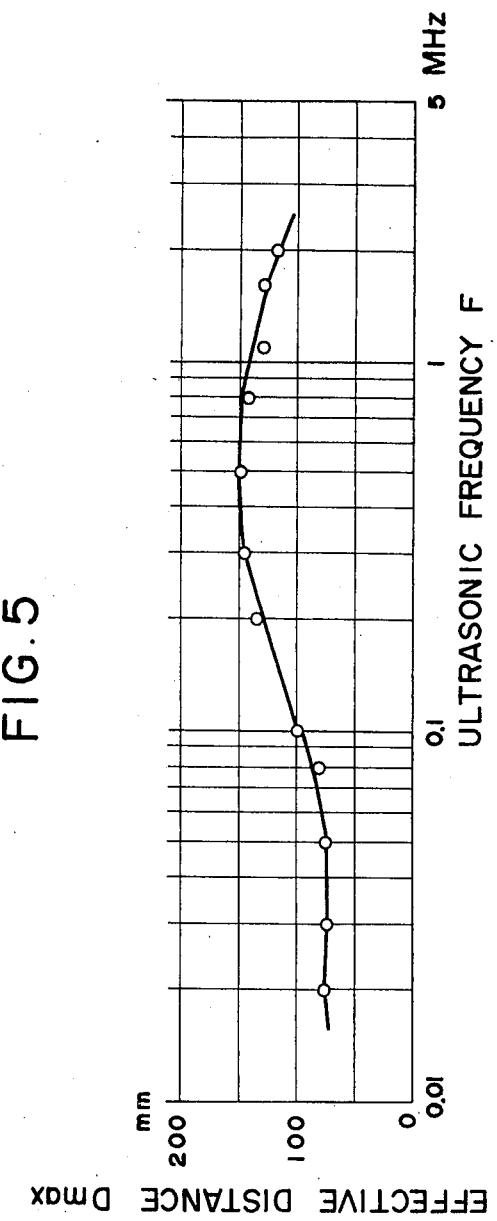
FIG. 5 is a graph plotting the frequency of ultrasonic waves along the abscissa and the distance between the assemblies and the machining interface which is effective to improve the machining performance and efficiency.

From FIGS. 4 and 5, it is seen that the mean removal rate and the maximum effective distance D are each constant when the frequencies of vibrations or ultrasonic waves are less then given values. When these values are exceeded, the removal rate and the maximum effective distance Dmax both increase markedly. It is particularly noted that the mean removal rate and the maximum effective distance both are constant and independent dependent of the frequency when the frequency is less than 100 kHz. When the frequency lies between 100 kHz and 2 MHz, especially between 200 and 1 MHz, however, there is achieved a marked increase as regards both the mean removal rate and the maximum effective distance Dmax in spite of a reduction of the ultrasonic output power. An increase up to 1.5 times the removal rate and an increase up to 2 times the maximum effective distance Dmax are indeed surprising.

It has been confirmed in general that when the vibrational frequency of ultrasonic waves emitted from ultrasonic assemblies arranged to surround the machining gap region lies in the range specified, machining is effected at a faster rate to yield a given surface roughness and gives rise to a smoother surface finish at a given removal rate. Furthermore, machining performance becomes more stable and controlling the machining operation is facilitated.

Figure 6:
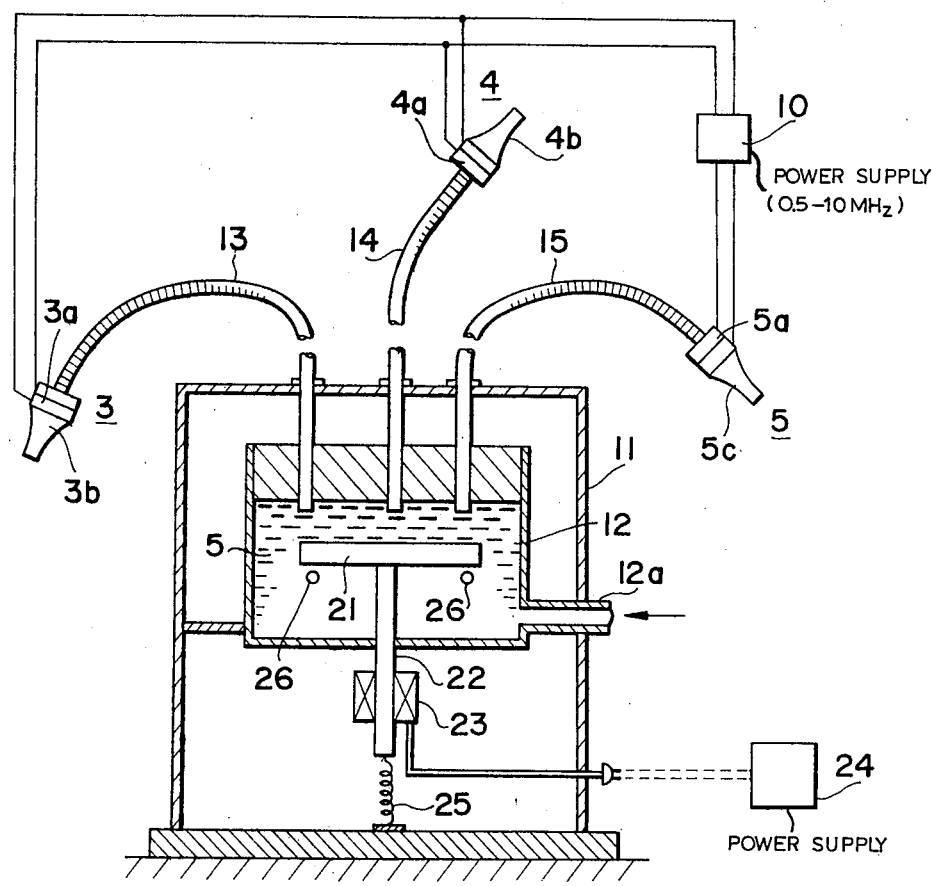
FIG. 6 is an elevational view partly in section, diagrammatically illustrating an embodiment of the invention in which a plurality of ultrasonic assemblies to be disposed so as to surround the machining interface are each formed with an fluid-jet nozzle, the nozzles being connected via respective flexible tubes to a fluid distribution chamber to be disposed within or outside the worktank.

FIG. 6 shows a fluid-jetting system for electrical machining, especially for an EDM operation, embodying the principles of the invention. The system includes a casing 11 in which is resiliently mounted a fluid-distribution chamber 12 having a fluid inlet 12a. The chamber 12 has as outlets a plurality of flexible but self-supporting tubes 13, 14 and 15 e.g. in the form of stainless-steel multi-joint pipes or vinyl-chloride pipes, coupled thereto for distributing a machining fluid supplied from the inlet 12a to these tubes. At the individual free ends of the tubes 13, 14 and 15 there are attached ultrasonic assemblies 3, 4 and 5 to be arranged in a manner as described in connection with FIGS. 1 and 2 or as will be described. Each ultrasonic assembly 3, 4, 5 comprises an electromechanical transducer 3a, 4a, 5a and a horn 3b, 4b, 5b having central openings registered with each other to form a fluid-jetting nozzle for permitting each of the distributed streams through tubes 13, 14 and 15 to be ejected and directed to the region of the machining gap. The transducer 3a, 4a 5a is energized by a power supply 10 to produce ultrasonic vibrations of a frequency in the range between 0.5 and 10 MHz, preferably between 0.1 and 2 MHz and to apply through the horn 3b, 4b and 5b the vibrations to each jetted stream of the machining liquid directed to the region of the machining gap.

The distribution chamber 2 is preferably formed further with means for vibrationally activating the machining liquid therein at a sonic or lower ultrasonic frequency, say between 100 Hz and 50 kHz. This means is shown comprising a vibratile plate 21 supported by a rod 22 disposed within the chamber 12 and adapted to be reciprocated therewith at the desired frequency by an electromagnetic system 23 energized by a power supply 24. The rod 22 is shown resiliently mounted on the bottom wall of the casing 11 by a spring 25. A pair of limiting pins 26 are provided in the chamber 12 to fix the lowermost position of the vibratile plate 21. By virtue of this auxiliary vibration means, each fluid-jet stream ejected from an ultrasonic/nozzle assembly 3, 4, 5 has the low-frequency vibrations upon which the high-frequency ultrasonic vibrations due to the operation of the respective transducers 3a, 3b, 3c are superimposed. As a result, it has been found that chips and tar generated at the machining gap by the electro-erosive machining process are removed with an increased facility from the minute machining gap or interface. In addition, the cooling effect for the tool electrode is improved, thus assuring an increased tool life, and the sharpness of a machined corner is improved and the removal rate is increased.

Figure 7:
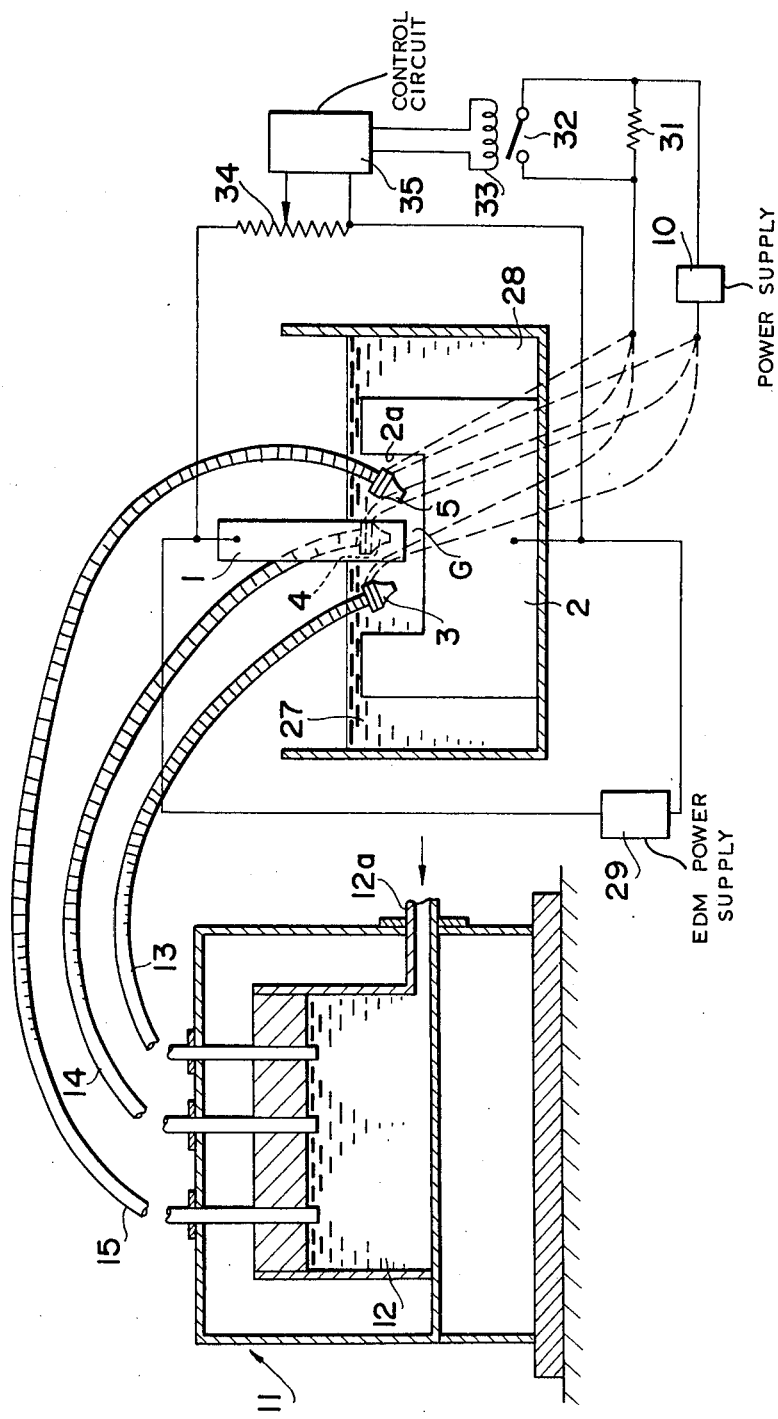
FIG. 7 is an elevational view partly in section of an apparatus basically of the type of FIG. 6, including an electrical machining power supply and circuit means for sensing the state of an electrical machining interface or gap for controlling the energization of the ultrasonic assemblies.

FIG. 7 shows a distribution chamber 12, a casing 11 and flexible tubes 13, 14 and 15 are in a form similar to that of FIG. 6, the tubes having at their individual free ends ultrasonic assemblies 3, 4 and 5 arranged to surround the region of the machining gap G defined between an EDM electrode 1 and workpiece 2 immersed in a machining liquid 27 received in a worktank 28. The tool electrode 1 and the workpiece 2 are shown connected to an EDM power supply 29 which furnishes a series of electrical machining pulses across the dielectric-liquid filled machining gap G to remove material from the workpiece 2. During a course of machining operation, the tool electrode 1 may be displaced three-dimensionally to form a cavity 2a in the workpiece 2.

The high-frequency ultrasonic power supply 10 is connected to the respective transducers of the ultrasonic assemblies via a parallel connection of a resistor 31 and an on-off switch 32 which is here shown by a reed switch operated by an electromagnetic coil 33. A sensing resistor 34 is connected across the tool electrode 1 and the workpiece 2 in parallel with the EDM power supply to detect the EDM gap condition in term of the voltage sensed at the resistor 34. A control circuit 35 is responsive to the sensed voltage and designed to energize the coil 33 when the voltage drops below a preselected threshold level. Thus, in a normal or satisfactory machining condition, the resistor 31 is in circuit between the power supply 10 and each of the ultrasonic assemblies 3, 4 and 5 to permit the ultrasonic waves at each assembly to be produced at a limited level. When the gap voltage drops below the threshold value, reflecting a short-circuit condition due to clogging of the gap region G with machining products, the coil 33 is energized to close the switch 32, thus shunting the current-limiting resistor 31 and directly connecting the power supply 10 to each of the transducers of the assemblies 3, 4 and 5. The assemblies 3, 4 and 5 are thus energized to produce the ultrasonic waves at a maximum level to intensify the gap cleaning action. While the casing 11 is shown disposed outside the worktank 28, it may be arranged within the latter.

In an embodiment of the invention shown in FIG. 8, six similar ultrasonic assemblies 3, 4, 5, 6, 7 and 8 are arranged so as to surround the region of an EDM gap or interface between the active electrode surface 1a of a tool electrode 1 in the form of a cone and a workpiece 2 in the form of a rectangular block supported on a pair of platforms in the worktank 28 containing a machining liquid to a level such that the assemblies 3–8 as well as the machining gap G region are fully immersed therein. In this embodiment, one of the ultrasonic assemblies 3 is shown swingably supported on a bifurcated support rod 37 and adjustably secured to the arms 37a and 37b thereof by means of a screw or bolt 38, the rod towards the upper end being fitted with a pipe 37c supported on a bifurcated base 39 and adjustably secured thereto by means of a screw or bolt 40. The position of the sleeve 37c on the arm rod 37 and hence the support length of the arms from the arm base 39 or the vertical position of the ultrasonic assembly 3 is adjustably established by a clamp screw 41. The base 39 is slidably movable on a guide rail 42 formed on an inner wall 28a of the worktank 29. The position of the arm base 39 on the guide rail 42 and hence the horizontal position of the assembly 3 is adjustably set by a pin or clamp screw 43. The angular or swivel position of the assembly 3 on the arms 37a and 37b of the support rod 37 and hence the angular orientation of the assembly 3 in the system is adjustably established by the adjustment of the screw or bolt 38. The other ultrasonic assemblies 4, 5, 6, 7 and 8 are similarly supported on side wall portions of the worktank 28 although the supply means are not shown for the sake of simplicity.

The ultrasonic assemblies 3, 4, 5, 6, 7 and 8 have their respective electromechanical transducers therein, each comprising a piezoelectric or electrostrictive element or magnetostrictive element, which are connected in phase with each other to the high-frequency generator 10 as shown in FIG 9. The circuit arrangement may be modified, as shown in FIG. 10, to include an amplifier 10a, 10b, 10c, 10d, 10e and 10f between the generator 10 and each of the transducers of the assemblies 3, 4, 5, 6, 7 and 8.

EXAMPLE

A workpiece composed of SKD-11 steel material is electro-erosively machined with a copper electrode as the tool and kerosine as the machining liquid while using varying numbers of ultrasonic assemblies, each operating at a frequency of 0.8 MHz. The EDM pulses have an on-time or pulse duration of 10 microseconds, an off-time or pulse interval of 5 microseconds and a peak current of 25 amperes. The results are shown in the graph of FIG. 11 in which the EDM removal rate (g/min) is plotted along the ordinate and the machining depth (mm) is plotted along the abscissa. In the graph, the curve A is for the use of a single ultrasonic assembly, the curve B for two ultrasonic assemblies and the curve C for four ultrasonic assemblies.

The embodiment of FIG. 12 makes use of a first group of ultrasonic assemblies 3, 4 and 5 operating at a high ultrasonic frequency in the range between 0.1 and 1.6 MHz and a second group of ultrasonic assemblies 6, 7 and 8 operating at a low ultrasnoic frequency in the range betweeen 20 and 50 kHz, the assemblies 3–5 and the assemblies 6–8 in each group being arranged with symmetry such as to surround the machining gap region defined between the tool 1 and the workpiece 2 in the worktank 28 as described previously.

Referring to FIG. 13, assemblies 3, 4 and 5 in the first group are shown energized in phase with each other by a power supply 100 comprising a DC source 101, a high-frequency oscillator 102 and an amplifier 103 while assemblies 6, 7 and 8 in the second group are shown energized in phase with each other by a power supply 104 comprising a DC source 105, a low-frequency oscillator 106 and an amplifier 107.

There is thus provided an improved method as well as an apparatus for machining, by electroerosion whereby the machining efficiency, stability and performance are substantially improved.

What is claimed is:

1. A maching method wherein a workpiece is immersed in a machining liquid received in a worktank and a tool electrode is juxtaposed with the workpiece in the worktank to define a machining interface therebetween filled with the machining liquid, the method comprising the steps of:

disposing a plurality of ultrasonic assemblies in said machining liquid within said worktank in such manner that they are spaced apart from each other and from said machining interface and are oriented towards said machining interface so as to surround the region of said interface in a direct wave-transmitting relationship therewith through said machining liquid; and individually energizing said assemblies respectively to generate separate beams of ultrasonic waves thereat each individually of a vibrational frequency between 0.05 and 10 MHz and transmitting said beams of ultrasonic waves jointly to the region of said machining interface through said machining liquid.

2. The method defined in claim 1 wherein the said frequency is in the range between 0.1 and 2 MHz.

3. A method as defined in claim 1 wherein each of said ultrasonic assemblies is formed with a nozzle and positionable to orient said nozzle in the direction of said machining interface, the method further comprising the steps of providing a forced flow of said machining liquid from a liquid source through each of said nozzle towards said machining interface and applying said ultrasonic waves at each of said assemblies to said forced flow of the machining liquid directed to the machining interface in said worktank.

4. A method as defined in claim 3, further comprising the step of vibrationally activating at a frequency of 100 Hz to 50 kHz said forced flow of the machining liquid prior to passage into said nozzle independently of said ultrasonic waves.

5. A method as defined in claim 1, claim 2, claim 3 or claim 4, further comprising the steps of sensing the state of said machining interface to provide an electrical signal representative thereof and controlling at least one parameter of said ultrasonic waves in response to said electrical signal.

6. A method as defined in claim 1 wherein said ultrasonic assemblies are energized in phase with each other by a high-frequency power supply.

7. The method as defined in claim 1, further comprising disposing at least one additional ultrasonic assembly operating at a frequency of 20 kHz to 50 kHz in a wave-transmitting relationship with the region of said machining interface through said machining liquid.

8. The method defined in claim 7 wherein a plurality of such additional ultrasonic assemblies are disposed so as to surround the region of said machining interface.

9. The method defined in claim 8 wherein said additional ultrasonic assemblies are energized in phase with each other by a low-frequency power supply independent of said high-frequency power supply.

10. The method defined in claim 1 wherein said tool is an electrical discharge machining tool electrode and said machining liquid is a dielectric liquid.

11. A machining apparatus having a worktank arranged to contain a machining liquid for having a workpiece immersed in said liquid, and a tool positionable to be juxtaposed with said workpiece so as to define a machining interface therebetween filled with said machining liquid, said apparatus comprising:

a plurality of ultrasonic assemblies disposed in said machining liquid within said worktank and spaced apart from each other and from said machining interface in such manner as to orient towards said machining interface and to surround the region of said machining interface in a direct wave-transmitting relationship therewith, each of said assemblies including an electromechanical transducer; and power supply means for individually energizing said transducers whereby to generate in said liquid at each of the locations of said assemblies a separate beam of ultrasonic waves of a frequency ranging between 0.05 and 10 MHz, thereby permitting said separate beams to be transmitted jointly to the region of said machining interface through said machining liquid.

12. The apparatus defined in claim 11 wherein said transducers and said power supply means are adapted to provide said ultrasonic waves at a vibrational frequency between 0.1 and 2 MHz.

13. The apparatus defined in claim 11 wherein each of said ultrasonic assemblies is formed with a liquid injection nozzle and positionable to orient the letter in the direction of said region of machining interface for providing a forced flow of said machining liquid from a liquid source through each of said nozzles towards said machining interface and wherein each of said ultrasonic assemblies is adapted to apply said ultrasonic waves to a respective one of said forced flows of said machining liquid directed towards said machining interface in said worktank.

14. The apparatus defined in claim 13 wherein said liquid source includes a distribution chamber having a liquid inlet for receiving said machining liquid and a plurality of liquid outlets connected respectively to said nozzles through individual fluid conduits.

15. The apparatus defined in claim 14 wherein each of said individual liquid conduits comprises a flexible tube capable of self-sustaining to permit positioning the ultrasonic assembly associated therewith at a predetermined location and with a predetermined orientation.

16. The apparatus defined in claim 15 wherein said flexible and self-supporting tube is a metallic a respective one pipe.

17. The apparatus defined in claim 14 wherein said distribution chamber is adapted to be disposed within said worktank.

18. An apparatus defined in claim 14, further comprising low-frequency vibrator means disposed in said distribution chamber for vibrationally activating said machining liquid therein at a frequency between 100 Hz and 50 kHz.

19. An apparatus defined in claim 11 or claim 13, further comprising detector means for sensing the electrical conditions at said machining interface to provide an electrical signal and control means responsive to said electrical signal for acting on said power supply means to control at least one parameter of said ultrasonic waves produced at each of said assemblies.

20. The apparatus defined in claim 11 wherein each of said ultrasonic assemblies is detachably mounted to a side wall portion of said worktank through means for adjusting a vertical position thereof, means for adjusting a horizontal position thereof and means for adjusting an angular position thereof, each generally independently from others.

21. The apparatus defined in claim 11 wherein each of said assemblies includes an electromechanical transducer, each of said transducers being connected in phase with others to a common high-frequency generator constituting said power supply means.

22. The apparatus defined in claim 21 wherein said electromechanical transducer is one selected from the class which consists of an piezoelectric element, electrostrictive element and magnetostrictive element.

23. An apparatus as defined in claim 11, further comprising at least one additional ultrasonic assembly disposed in said worktank in a wave-transmitting relatonship with the region of said machining liquid and energizable by a power supply means independent of said first-mentioned power supply means for providing ultrasonic waves at a frequency of 2 kHz to 50 kHz.

24. The apparatus defined in claim 21 wherein a plurality of such additional ultrasonic assemblies are disposed so as to surround the region of said machining interface.

25. The apparatus defined in claim 24 wherein said additional ultrasonic assemblies are connected in phase with each other to said second-mentioned power supply.

* * * * *